(12) United States Patent
Johnson

(10) Patent No.: US 12,521,671 B1
(45) Date of Patent: Jan. 13, 2026

(54) CARBON DIOXIDE ABSORPTION WITH LIQUID

(71) Applicant: Eidon, LLC, Mercer Island, WA (US)

(72) Inventor: Roger N. Johnson, Mercer Island, WA (US)

(73) Assignee: EIDON, LLC, Mercer Island, WA (US)

( * ) Notice: Subject to any disclaimer, the term of this patent is extended or adjusted under 35 U.S.C. 154(b) by 0 days.

(21) Appl. No.: 18/938,267

(22) Filed: Nov. 5, 2024

(51) Int. Cl.
  *B01D 53/18* (2006.01)
  *B01D 53/14* (2006.01)

(52) U.S. Cl.
  CPC ....... *B01D 53/185* (2013.01); *B01D 53/1412* (2013.01); *B01D 53/1475* (2013.01); *B01D 53/1493* (2013.01); *B01D 2252/103* (2013.01); *B01D 2252/2023* (2013.01); *B01D 2257/504* (2013.01); *B01D 2258/06* (2013.01)

(58) Field of Classification Search
  CPC .............. B01D 53/185; B01D 53/1412; B01D 53/1475; B01D 53/1493; B01D 2252/103; B01D 2252/2023; B01D 2257/504; B01D 2258/06
  See application file for complete search history.

(56) References Cited

U.S. PATENT DOCUMENTS

| | | | | |
|---|---|---|---|---|
| 4,335,001 A * | 6/1982 | Aurelle | ................ | B01D 17/045 210/708 |
| 7,160,362 B2 * | 1/2007 | Terada | ................ | F24F 3/14 34/80 |
| 7,655,069 B2 * | 2/2010 | Wright | ................ | B01D 53/14 96/134 |
| 12,005,390 B1 * | 6/2024 | Scherpbier | ......... | B01D 53/1475 |
| 12,017,179 B1 * | 6/2024 | Scherpbier | ........... | B01D 53/185 |
| 2003/0000409 A1 * | 1/2003 | Blake | ................ | B41N 1/083 101/454 |
| 2009/0026063 A1 * | 1/2009 | Skiles | ................ | B01D 53/62 502/4 |
| 2013/0019577 A1 * | 1/2013 | Gleason | ................ | C12M 43/00 55/385.7 |
| 2018/0311606 A1 * | 11/2018 | Jung | ................ | B01D 53/48 |
| 2020/0368677 A1 * | 11/2020 | Adkins | ................ | B01D 53/92 |
| 2021/0308623 A1 * | 10/2021 | Sorimachi | ............ | B01D 53/326 |
| 2022/0176312 A1 * | 6/2022 | Olmstead | ................ | B01J 19/32 |
| 2022/0219132 A1 * | 7/2022 | Luo | ................ | B01J 8/087 |
| 2022/0362737 A1 * | 11/2022 | Staufcik | ............... | B01D 53/185 |
| 2023/0158450 A1 * | 5/2023 | Tormasi | ................ | B01D 53/18 55/468 |
| 2024/0033679 A1 * | 2/2024 | Heintz | ................ | B01J 20/103 |

* cited by examiner

Primary Examiner — Jennifer Dieterle
Assistant Examiner — Phillip Y Shao
(74) Attorney, Agent, or Firm — Freestone Intellectual Property Law PLLC; Aaron J. Visbeek

(57) ABSTRACT

A carbon dioxide absorption system includes a liquid input region, a liquid output region, a textured hydrophilic surface, and a liquid pump. The textured hydrophilic surface is disposed between the liquid input region and the liquid output region. The liquid pump is coupled to the liquid output region. The liquid pump is configured to pull liquid from the liquid input region to the liquid output region, over the textured hydrophilic surface to increase absorption of carbon dioxide of air into the liquid.

20 Claims, 11 Drawing Sheets

CARBON DIOXIDE ABSORPTION WITH LIQUID

TECHNICAL FIELD

This disclosure relates generally to carbon capture, and in particular to carbon dioxide absorption into liquids.

BACKGROUND INFORMATION

Carbon capture techniques are being developed to remove carbon dioxide from the atmosphere. Carbon capture is one way to offset emissions from industrial or recreational activities, for example. The carbon capture industry includes Carbon Capture and Storage (CCS) as well as Direct Air Capture (DAC) techniques. It is desirable to reduce costs and increase efficiency of carbon capture processes.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of carbon dioxide absorption into liquids are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Many different carbon capture and carbon mitigation techniques are being attempted and industrialized. These efforts include Carbon Capture and Storage (CCS), Direct Air Capture (DAC), Mineral Carbonation, and Enhanced Oil Recovery, for example. However, none of these techniques are particularly energy efficient. Even carbon capture techniques that leverage local geo-thermal energy could be significantly more efficient.

In implementations of the disclosure, carbon dioxide absorption in liquid (e.g. water or glycol) is enhanced by pulling the liquid over a textured hydrophilic surface. A liquid may be placed under tension by a liquid pump that pulls the liquid over the textured hydrophilic surface. The textured hydrophilic surface may include microstructures sized between 1 micron and 50 microns, in some implementations. The textured hydrophilic surface may include microstructures sized between 1 micron and 100 microns, in some implementations. The microstructures may be formed by sand adhered to a substrate, metal being anodized, mesh, and/or steel wool, for example. In some implementations, one or more fans drive air over the liquid to increase the carbon dioxide absorption. Since absorbing carbon dioxide into the liquid only causes a modest expansion of the liquid (e.g. 2-10% expansion) and can be achieved by applying negative pressure with a liquid pump, the disclosed carbon capture technique is exceedingly efficient, when compared to conventional techniques. These and other embodiments are described in more detail in connection with FIGS. 1-6.

Figure 1:
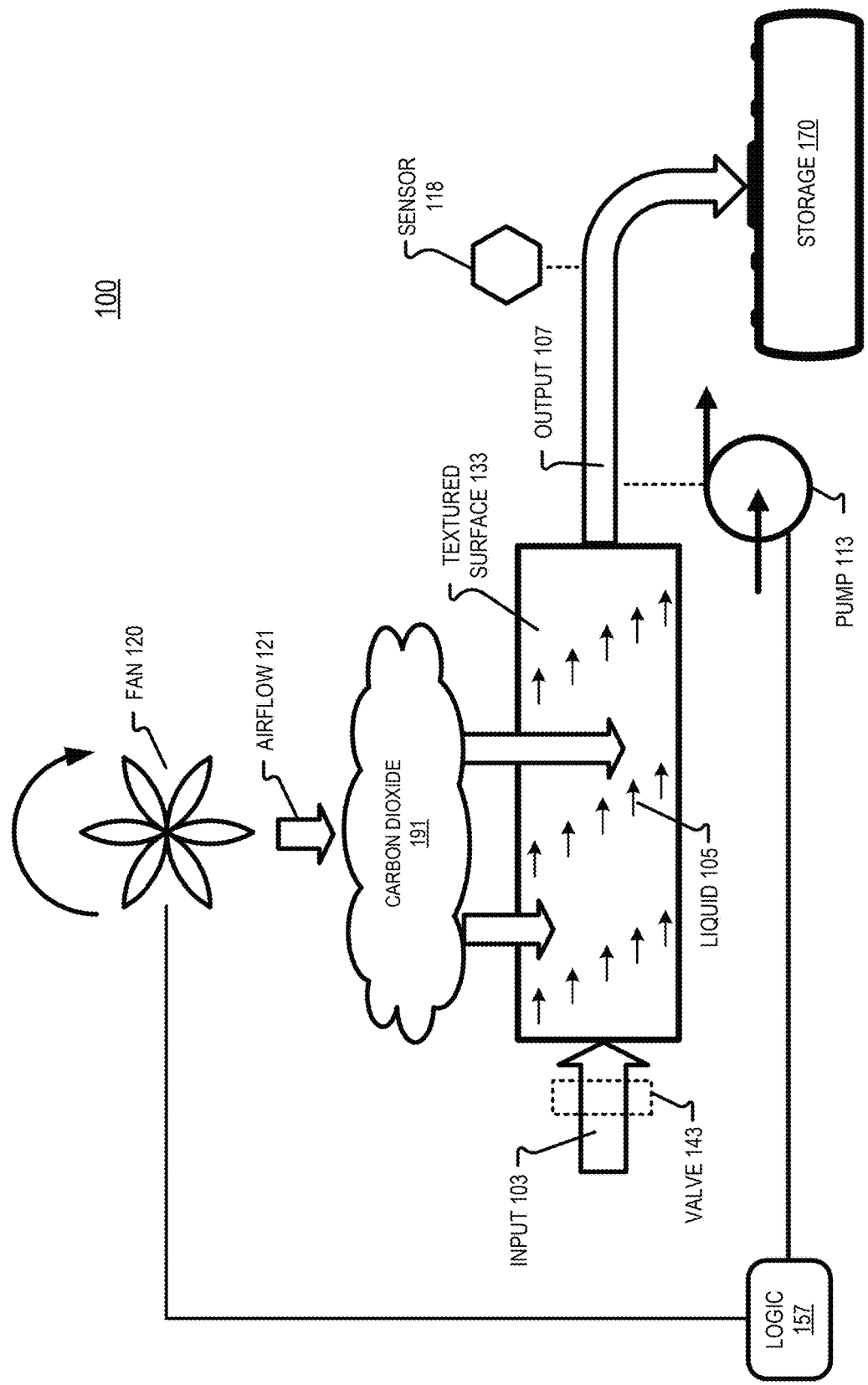
FIG. 1 illustrates a carbon dioxide absorption system, in accordance with aspects of the disclosure.

FIG. 1 illustrates carbon dioxide absorption system 100, in accordance with aspects of the disclosure. FIG. 1 includes a liquid input region 103, a liquid output region 107, and a textured hydrophilic surface 133 disposed between the liquid input region 103 and the liquid output region 107. Liquid pump 113 is coupled to the liquid output region 107. Liquid pump 113 is configured to pull liquid 105 (e.g. water or glycol) from the liquid input region 103 to the liquid output region 107, over the textured hydrophilic surface 133 to increase absorption of carbon dioxide 191 of air into the liquid being pulled over the textured hydrophilic surface 133. The liquid may be a polar liquid, which exhibits exceptionally high absorption rates. While this disclosure describes carbon dioxide as an example gas for absorption into liquid, in some implementations, other gases may be absorbed using tension absorption techniques described herein.

In implementations of the disclosure, the liquid 105 being pulled from the liquid input region 103 to the liquid output region 107 is placed under tension by liquid pump 113. Liquid pump 113 may pump liquid 105 away from liquid output region 107 in order to place the liquid 105 traversing textured hydrophilic surface 133 under tension. The tension of the liquid may be between 10 pounds-per-square-inch (PSI) and 500 PSI, for example. The tension of the liquid may be between 60 pounds-per-square-inch (PSI) and 250 PSI, for example. In some implementations, the tension is approximately 100 PSI. In some implementations, the tension is approximately 200 PSI.

System 100 may optionally include a flow sensor 118, one or more fans 120, and/or storage 170. Processing logic 157 may be included in system 100. Processing logic 157 may be configured to receive flow data from flow sensor 118. Processing logic 157 may be configured to drive liquid pump 113. Processing logic 157 may be configured to drive fan(s) 120. Storage 170 may be a tank, for example. The tank may be stored above ground or below ground.

Fan(s) 120 may be configured to drive ambient air (indicated by airflow 121) over the liquid 105 being pulled over textured hydrophilic surface 133. Fans 120 may be configured to drive the air opposite a flow direction of the liquid flowing from the liquid input region 103 to the liquid output region 107.

In implementations of the disclosure, system 100 includes a pressure regulator valve 143 configured to limit a tension of the liquid 105 being pulled over the textured hydrophilic surface 133 to a threshold-limit. The threshold-limit is between 60 PSI and 250 PSI, in some implementations. The threshold-limit is between 10 PSI and 500 PSI, in some implementations. The threshold-limit is approximately 100 PSI, in some implementations. The threshold-limit is approximately 200 PSI, in some implementations. In some implementations, pressure regulator valve 143 includes a check-valve and a spring.

Figure 2A:
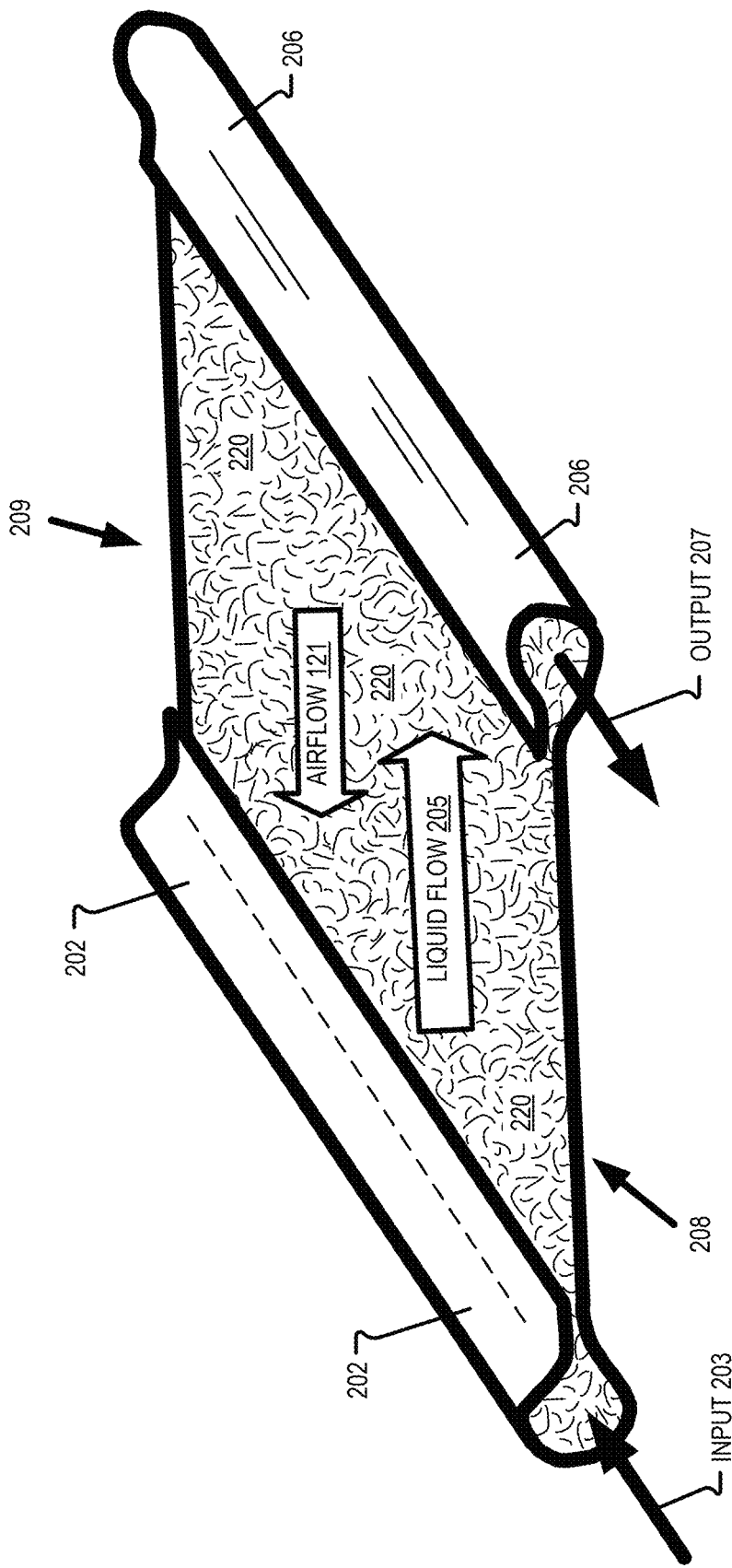
FIG. 2A illustrates an example carbon capture device including a textured hydrophilic surface disposed between a liquid input region and a liquid output region, in accordance with aspects of the disclosure.

FIG. 2A illustrates an example carbon capture device 200 including a textured hydrophilic surface 220 disposed between the liquid input region 203 and the liquid output region 207, in accordance with aspects of the disclosure. Device 200 includes an input manifold 202 configured to receive the liquid.

Input manifold 202 may be approximately cylindrical. Input manifold 202 may receive liquid from liquid input region 203. Input manifold 202 may be configured to distribute the received liquid from the front 208 of device 200 to the back 209 of device 200 so that a two-dimensional (2D) sheet of liquid is spread (flowing) across textured hydrophilic surface 220 between input manifold 202 and output manifold 206. Device 200 may be positioned so that output manifold 206 is at a lower height than input manifold 202 so that the flow of the liquid over textured hydrophilic surface 220 is gravity-assisted.

Output manifold 206 may also be approximately cylindrical. Output manifold 206 may be configured to receive the 2D sheet of liquid from the front 208 of device 200 to the back 209 of device 200 and drain output manifold 206 to output the liquid to liquid output region 207. In some implementations, a hose fitting is included on manifolds 202 and 207 on the front 208 of device 200 to provide the liquid and drain the liquid from device 200. In some implementations, manifolds 202 and 206 are capped on the back 209 of device 200 to prevent liquid from escaping manifolds 202 and 206. In some implementations, a hose fitting is included on both the front and back of input manifold 202 provide the liquid to device 200. The liquid flowing out of liquid output region 207 is carbon-enriched compared to the input liquid flowing into liquid input region 203.

Figure 2B:
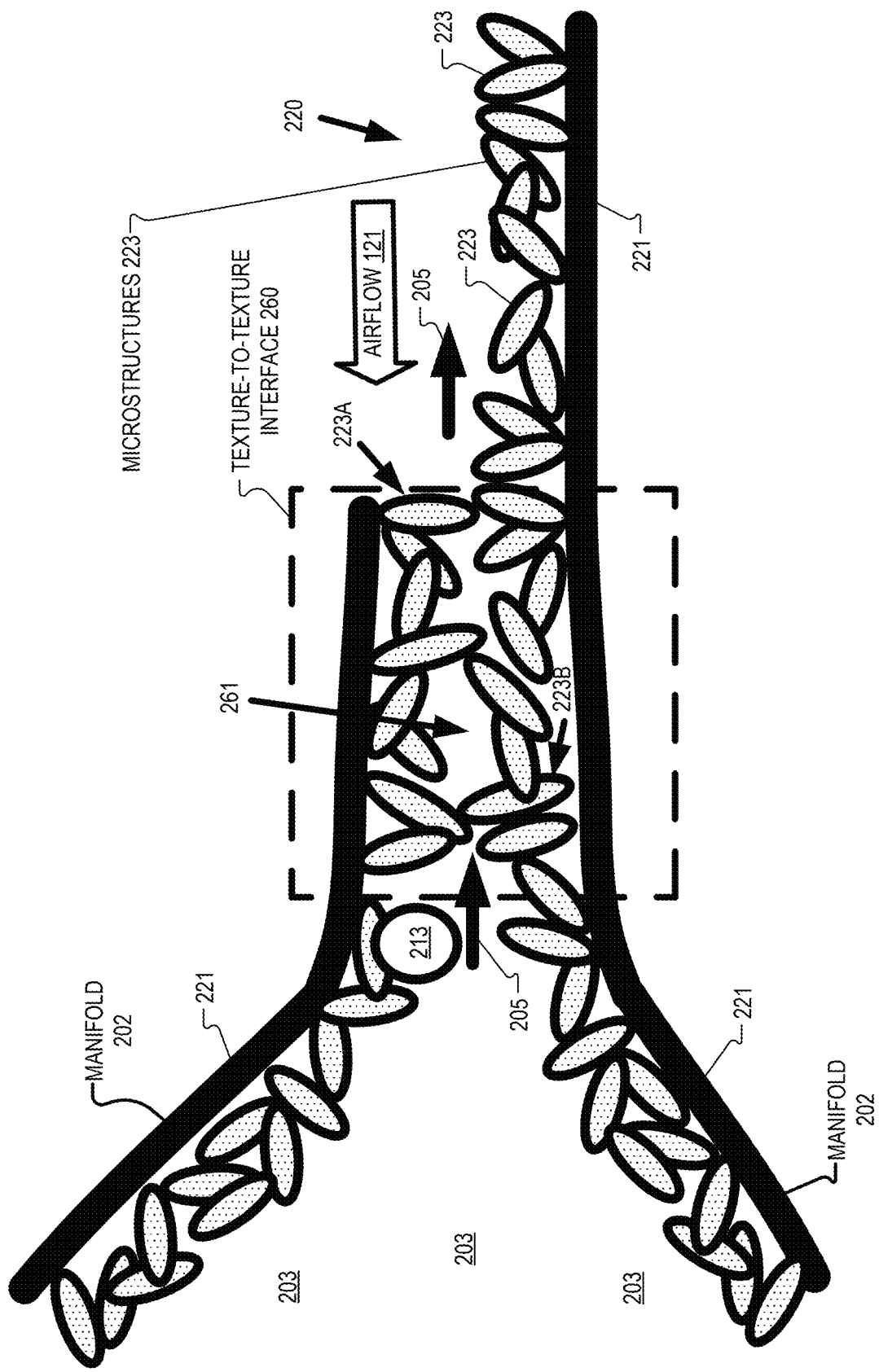
FIG. 2B provides a zoomed-in view of a cross-section of a manifold and textured hydrophilic surface, in accordance with aspects of the disclosure.

FIG. 2B provides a zoomed-in view of a cross-section of example manifold 202 and textured hydrophilic surface 220, in accordance with aspects of the disclosure. FIG. 2B shows just a portion of manifold 202 at liquid input region 203. In FIG. 2B, a texture-to-texture interface 260 is disposed between liquid input region 203 and textured hydrophilic surface 220.

FIG. 2B illustrates microstructures 223 of textured hydrophilic surface 220 that provide the texture of textured hydrophilic surface 220. Microstructures 223 may be formed in a variety of ways. Microstructures 223 may be grains of sand adhered to a substrate 221. Substrate 221 may be a plastic or metal, for example. Substrate 221 may be flexible. In some implementations, microstructures 223 are formed by anodizing a metal such as aluminum. The anodizing process may form microstructures 223 on the surface of the aluminum to give texture to the aluminum, for example. In other implementations, metals or other materials may be wet or dry etched to form microstructures 223 that provide the texture to textured hydrophilic surface 220.

By way of illustration, one way to manufacture the structure shown in FIG. 2B includes adhering sand (as microstructures 223) to substrate 221. The size of the sand may correspond to between 500-grit sandpaper and 4000-grit sandpaper. The size of the sand may correspond to approximately 2000-grit sandpaper, in some implementations. After the sand is adhered to a sheet of substrate 221, you essentially have a large sheet of sandpaper where a more water resilient substrate 221 is used instead of paper. The sheet may be 1 feet by 1 feet, for example. The sheet may be 10 feet by 10 feet, or larger, in some implementations. The ends of the sheet of sandpaper can then be wrapped around two cylinders to form manifolds 202 and 206 and the very end of the sheet wrapped around the cylinder can be affixed (e.g. clamped or glued at the edges) to the rest of the sheet of sandpaper to form texture-to-texture interface 260 while the remaining sheet of sandpaper is the textured hydrophilic surface 220. The cylinders can be removed after the end of the sandpaper is affixed back on itself and the substrate 221 previously wrapped around the cylinder forms the structure of manifolds 202 and 206, in some implementations.

This example illustration describing a sandpaper variation is simply an illustration and those skilled in the art appreciate that this fabrication process could be reused and/or modified to fabricate other implementations of the disclosure where microstructures 223 are not sand. For example, an anodized sheet of aluminum could be wrapped around a cylinder to form manifolds 202 and 206 and then clamped so that the texturized sides of the anodized aluminum form texture-to-texture interface 260 while the remaining sheet of anodized aluminum is the textured hydrophilic surface 220. In the aluminum sheet implementations, the solid aluminum sheet may be considered substrate 221 (height not drawn to scale) while the anodized surface may be considered microstructures 223, in FIG. 2B.

In operation, liquid 205 flows into input manifold 202 and flows through capillaries 261 of texture-to-texture interface 260 toward textured hydrophilic surface 220. While top microstructures 223A of interface 260 may contact at least a portion of bottom microstructure 223B of interface 260, there is still sufficient space between microstructures 223A and 223B for liquid 205 to flow through capillaries 261. The capillaries 261 may be sized between 1 micron and 20 microns to allow the liquid 205 to flow through while removing any bubbles 213 from the liquid 205 prior to the liquid 205 being pulled over textured hydrophilic surface 220.

FIG. 2B illustrates that liquid 205 flowing across textured hydrophilic surface 220 may be met with airflow 121 from fans 120 where the airflow 121 is in a direction approximately opposite to liquid flow 205 to increase the absorption of carbon dioxide in liquid 205. While FIG. 2B only illustrates liquid input region 203 and input manifold 202, liquid output region 207 and output manifold 206 may be similarly configured.

Figure 2C:
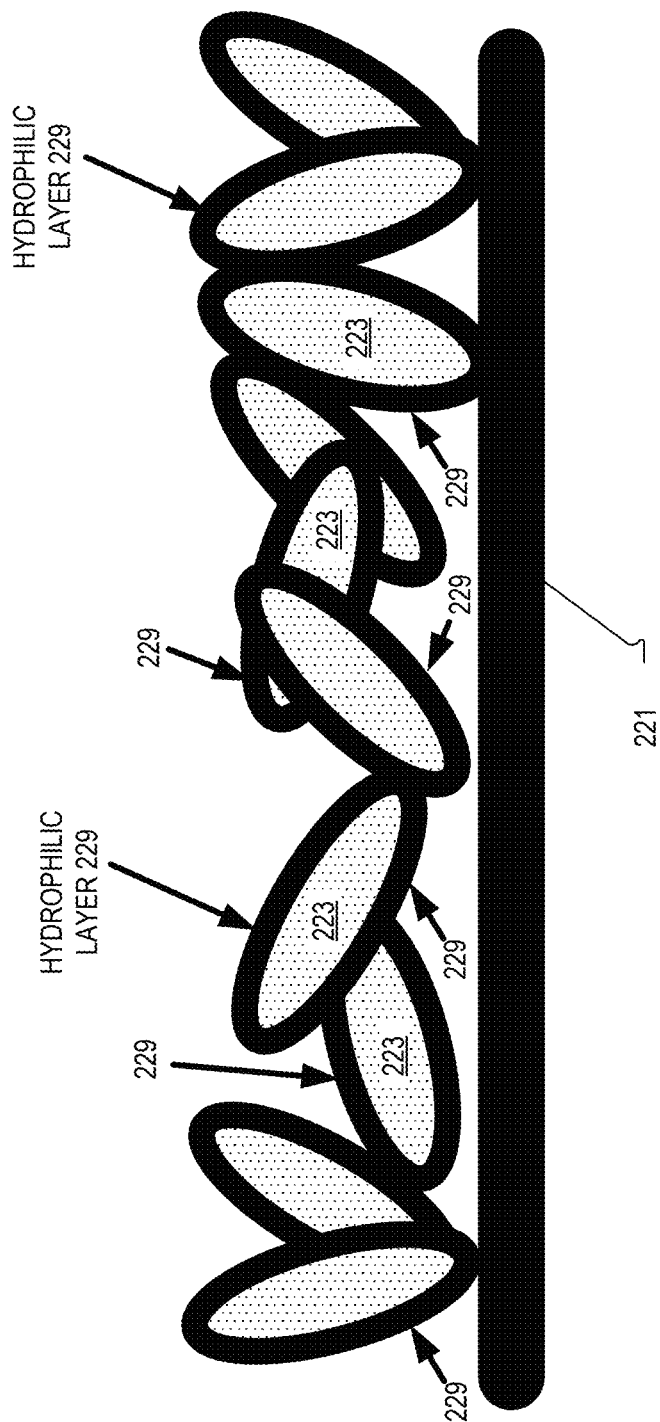
FIG. 2C illustrates an alternative example of a textured hydrophilic surface, in accordance with aspects of the disclosure.

FIG. 2C illustrates an alternative example of a textured hydrophilic surface, in accordance with aspects of the disclosure. Textured hydrophilic surface 250 may be used in place of textured hydrophilic surface 220, in some examples. Textured hydrophilic surface 250 includes a substrate 221 and microstructures 223 while also adding an additional hydrophilic layer 229 disposed over microstructures 223. The additional hydrophilic layer 229 is shown as the large black lines surrounding microstructures 223. Hydrophilic layer 229 may be formed on microstructures 223 using a plasma and gas treatment to allow hydrophilic layer 229 to form within the small contours of microstructures, for example. Hydrophilic layer 229 is a surface coating on microstructure 223 that is thin enough so that it conforms to the roughened/textured surface formed by microstructures 223 rather than filling in the peaks and valleys of microstructures 223. Hydrophilic layer 229 may include self-assembled monolayer of thin films (solid acquisition of gas molecules) of carboxyl or hydroxyl ends. Hydrophilic layer 229 may include surface plasma treatment introduced polar function groups. Hydrophilic layer 229 may include silane based coatings such as (3-Aminopropyl) triethoxysilane ("APTES"). Adding a hydrophilic layer 229 may enhance the hydrophilic nature of various microstructures 223 of a textured hydrophilic surface.

Figure 2D:
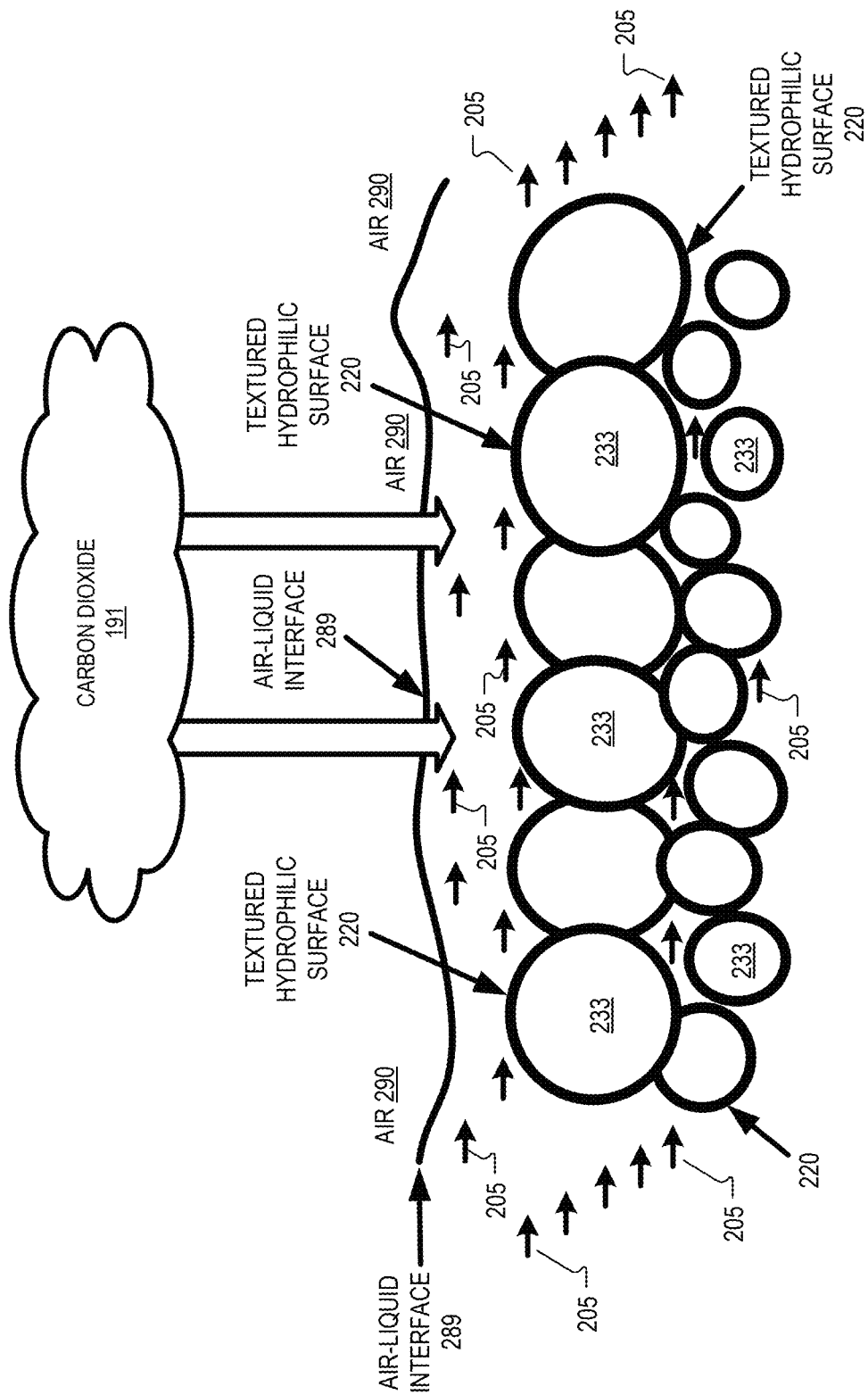
FIG. 2D illustrates a zoomed-in version of liquid traversing microstructures of a textured hydrophilic surface to increase absorption of carbon dioxide in liquid, in accordance with aspects of the disclosure.

FIG. 2D illustrates a zoomed-in version of liquid 205 traversing microstructures 233 of textured hydrophilic surface 220 to increase absorption of carbon dioxide 191 in liquid 205, in accordance with aspects of the disclosure. FIG. 2D illustrates an air-liquid interface 289 formed between the air 290 (that includes carbon dioxide 191) and liquid 205. Air-liquid interface 289 may be considered a semi-solid membrane and may be only a single molecule thick. FIG. 2D shows that air-liquid interface 289 approximately follows the shapes of the underlying microstructure 233. In operation, air-liquid interface 289 is tensioned by the negative pressure applied (by liquid pump 113, for example). Textured hydrophilic surface 220 serves to attach the liquid to the surface opposite of air-liquid interface 289. Textured hydrophilic surface 220 is on top of microstructures 233 and within and between microstructures 233. It is between the hydrophilic surfaces of microstructures 233 that the liquid can sustain tension. Cavitations bubbles may form a sphere which requires the creation of additional interface tension surfaces that are impeded by the presence of liquid layers already part of the attached surfaces. In effect, there is not enough free flowing liquid to create the required new air-liquid interface layer. Hence the tight curved spaces have lower cavitation risk.

In some implementations, the space between microstructures 233 may be approximately 1 micron to 20 microns, on average. These spaces allow liquid 205 to flow through microstructures 233 in a textured hydrophilic surface 220 without the meniscus of air-liquid interface 289 collapsing and introducing air bubbles (cavitation) into liquid 205. The small size (e.g. diameter of the microstructures 223/233) allows liquid 205 to flow without cavitation which increases the absorption of carbon dioxide 191 into liquid 205 since cavitation would release the carbon dioxide 191 back into air 290. Carbon dioxide is absorbed into the liquid at air-liquid interface 289 and diffuses into the bulk fluid. Carbon dioxide can also diffuse from a moving air stream through a static air layer to reach the air-liquid interface. Both of these routes may be employed to increase absorption. The size of the microstructures 223/233 may be between 1 micron and 20 microns, in some examples. The size of the microstructures 223/233 may be between 1 micron and 50 microns, in some examples. The size of the microstructures 223/233 may be between 1 micron and 100 microns, in some examples. The size of the microstructure 223/233 may be measured by their longest dimension, in some examples. The size of the microstructure 223/233 may have a corresponding tension (measured in PSI) that liquid 205 is able to sustain.

Figure 3A:
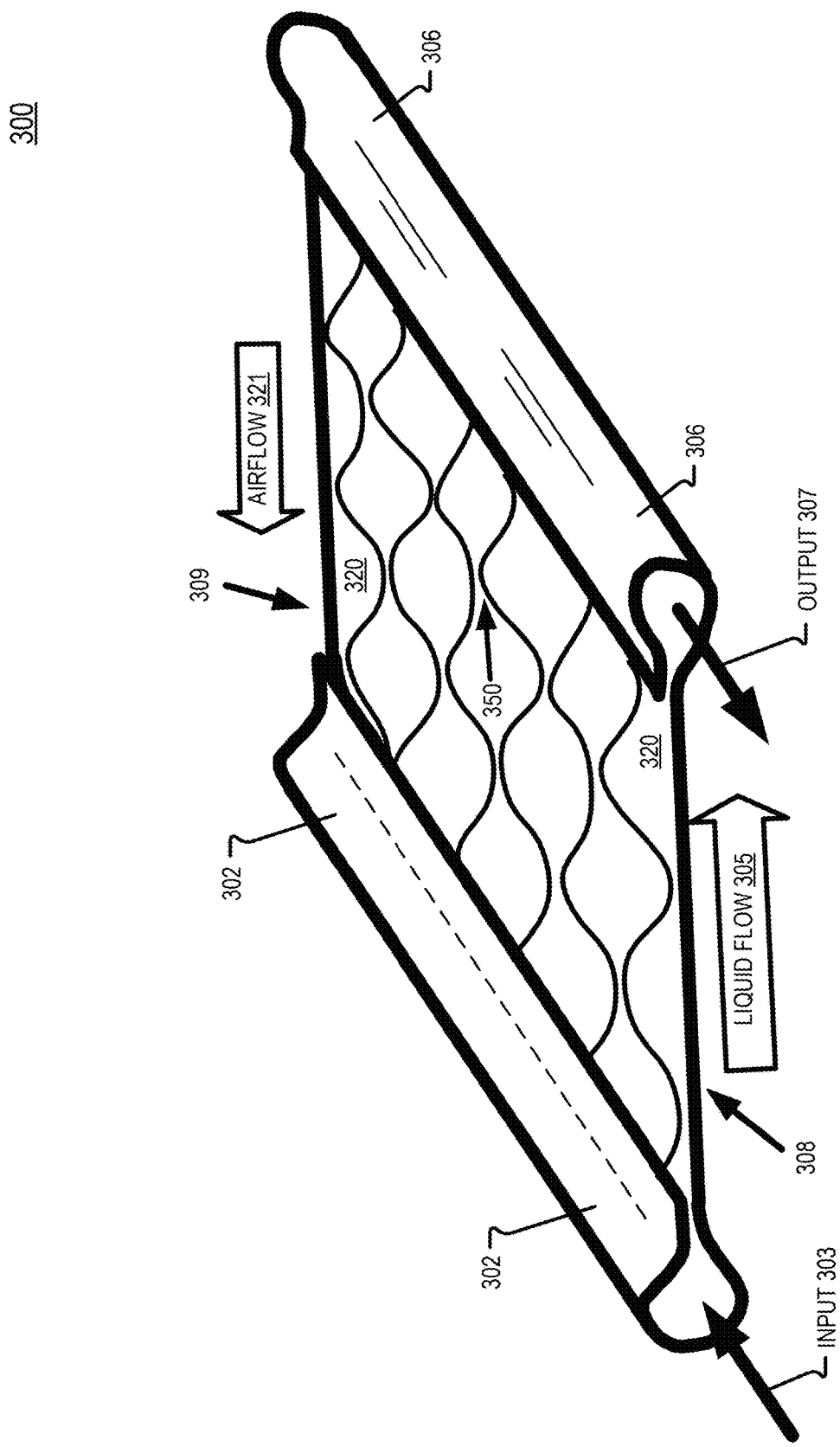
FIGS. 3A and 3B illustrate a carbon capture device including channels in a textured hydrophilic surface, in accordance with aspects of the disclosure.
Figure 3B:
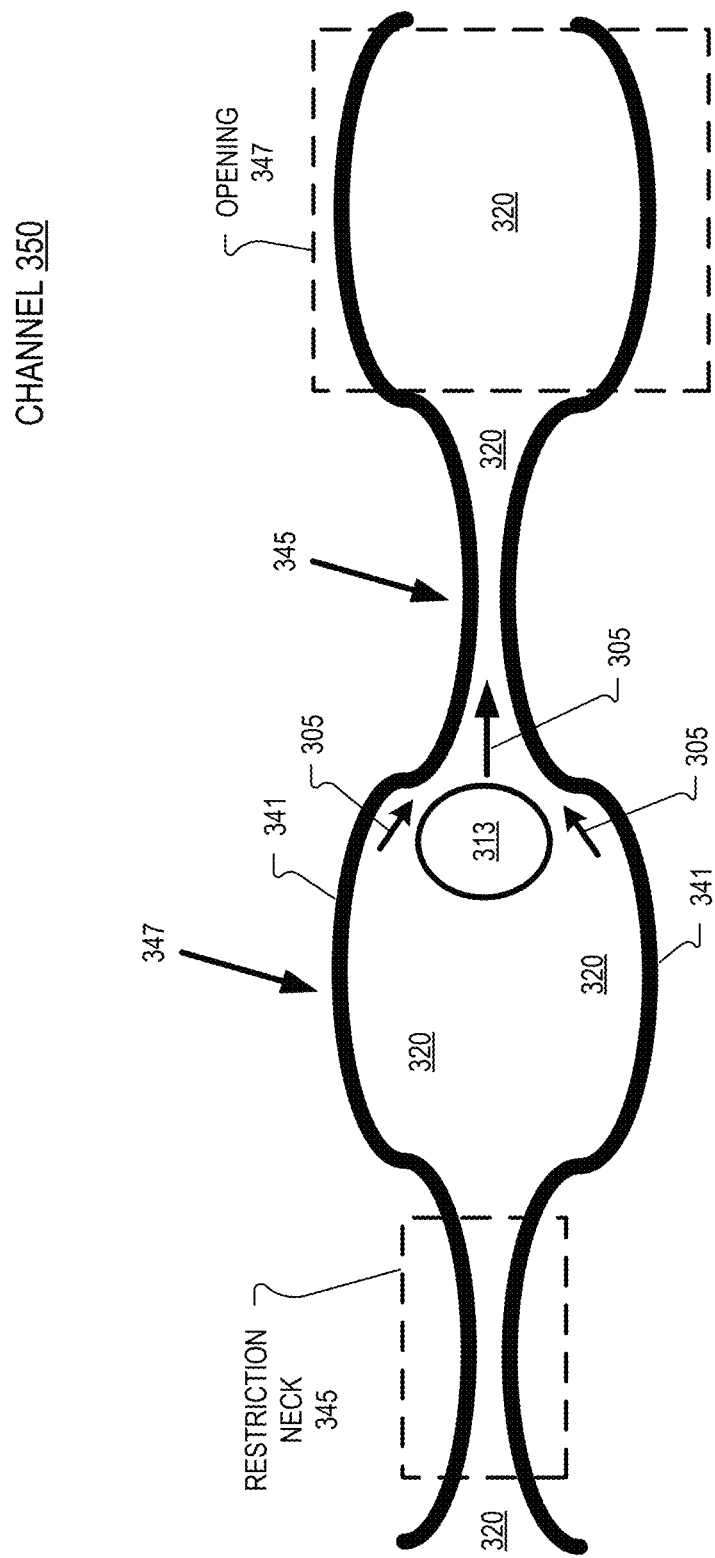

FIGS. 3A and 3B illustrate a carbon capture device 300 including channels 350 in a textured hydrophilic surface 320, in accordance with aspects of the disclosure. Carbon capture device 300 may have similar features as device 200. Device 300 includes an input manifold 302 configured to receive the liquid. Input manifold 302 may be approximately cylindrical. Input manifold 302 may receive liquid from liquid input region 303. Input manifold 302 may be configured to distribute the received liquid from the front 308 of device 300 to the back 309 of device 300 so that a two-dimensional (2D) sheet of liquid is spread (flowing) across textured hydrophilic surface 320 between input manifold 302 and output manifold 306. FIG. 3A shows that airflow 321 from fan(s) 120 may flow in opposite direction as liquid flow 305. FIG. 3A shows that device 300 includes channels 350 in textured hydrophilic surface 320.

FIG. 3B illustrates a single example channel 350 that may be formed in textured hydrophilic surface 320, in accordance with aspects of the disclosure. Single Channel 350 in the textured hydrophilic surface includes openings 347 flowing into restriction necks 345. The restriction necks 345 are configured to restrict bubbles 313 from traversing the restriction neck 345 to the next opening 347 in channel 350. Restriction necks 345 may also be configured to prophylactically reabsorb the bubbles 313 into the liquid 305 flowing toward the liquid output region 307. Bubbles 313 will get stuck at the restriction necks 345 because the diameter of the bubble will be too large to squeeze through the width of restriction neck 345. Liquid 305 will continue to flow around bubble 313 and the bubble 313 may gradually be reabsorbed into liquid 305 flowing around bubble 313. The width of restriction necks 345 may be approximately 0.5-5 microns, in some examples. Channels 350 may be defined by hydrophobic barriers 341 in textured hydrophilic surface 320. Channels 350 may be defined by physical barriers having a height taller than textured hydrophilic surface 320.

In some implementations of the disclosure, processing logic 157 is configured to drive liquid pump 113 to temporarily increase a tension of the liquid to purge any bubbles within the liquid. This feature may be implemented in implementations where device 200 or device 300 is utilized. In some implementations, processing logic 157 drives the liquid pump 113 to temporarily increase the tension of the liquid in response to a flow rate of the liquid as measured by flow sensor 118. If the flow rate of the liquid drops below a particular flow-threshold, it may indicate that the system needs to be purged of bubbles that are restricting the liquid flow.

Figure 4A:
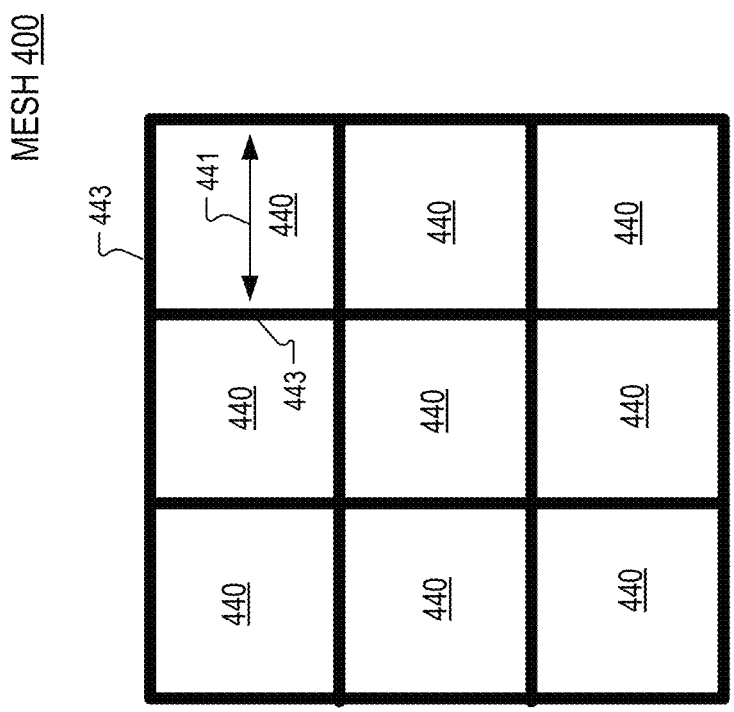
FIG. 4A illustrates a mesh that may be utilized to form a textured hydrophilic surface, in accordance with aspects of the disclosure.

FIG. 4A illustrates a mesh 400 that may be utilized to form a textured hydrophilic surface that may be used as textured hydrophilic surface 220, in accordance with aspects of the disclosure. Mesh 400 may be formed of fiber or wire 443, for example. Mesh 400 may have a single layer of cells 440 sized between a dimension 441 of 1 and 20 microns. In some implementations, dimension 441 is approximately 10 microns. In some implementations, multiple layers of mesh 400 are used to form textured hydrophilic surface 220. Liquid may flow on both sides of mesh 400 as the liquid is pulled from liquid input region 203 to liquid output region 207, when mesh is used as textured hydrophilic surface 220.

Figure 4B:
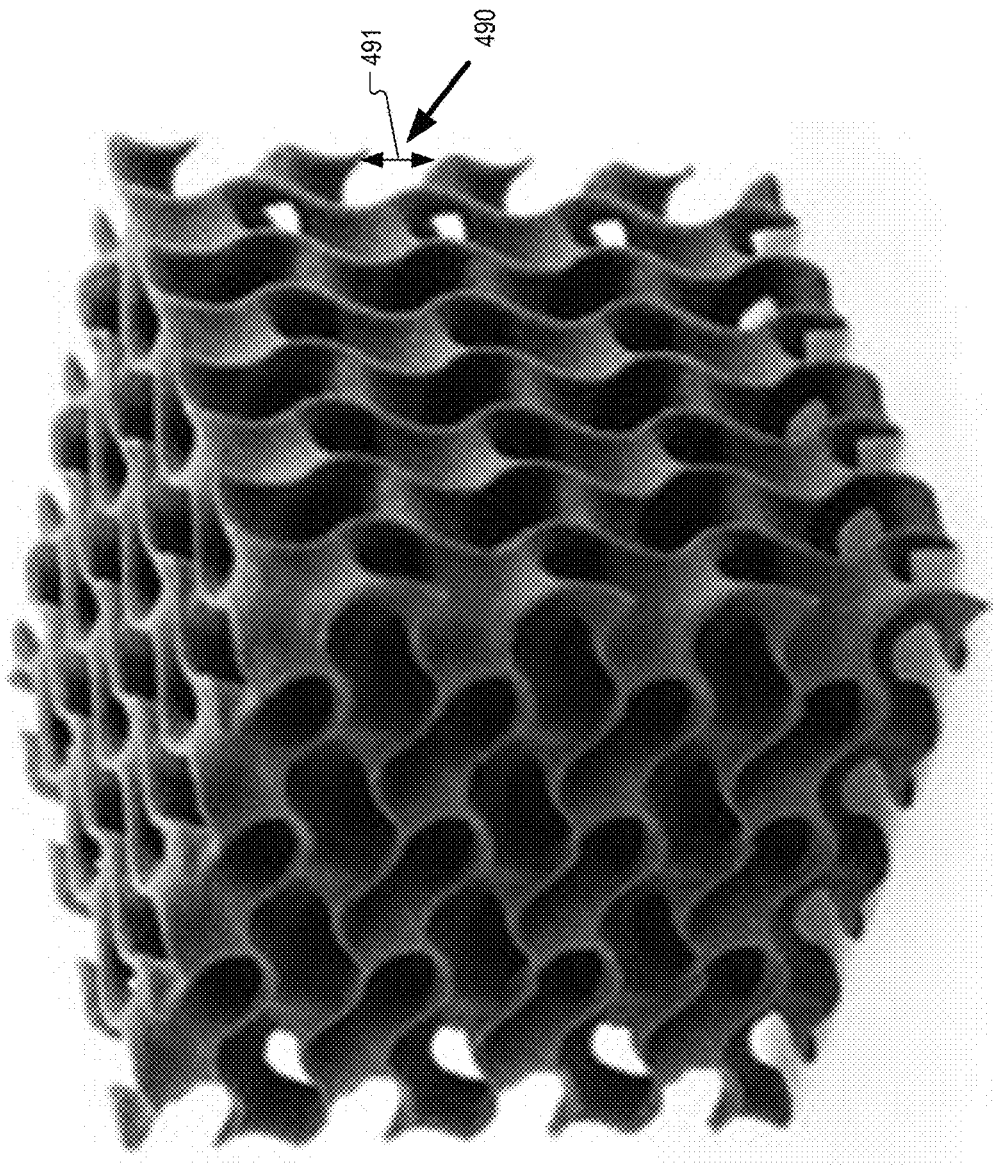
FIG. 4B illustrates a three-dimensional (3D) curved cavity structure that may be used to form a textured hydrophilic surface, in accordance with aspects of the disclosure.

FIG. 4B illustrates a three-dimensional (3D) curved cavity structure 450 that may be used to form a textured hydrophilic surface that may be used as textured hydrophilic surface 220, in accordance with aspects of the disclosure. The cavities 490 of 3D curved cavity structure 450 may have an opening dimension 491 of between 1 and 20 microns.

In other implementations of the disclosure steel wool with sharp-edged strands that keep airways open may be used to form a textured hydrophilic surface that may be used as textured hydrophilic surface 220.

In an implementation of the disclosure, a gyroid 3D fill pattern with continuous curved surfaces may be used to form a textured hydrophilic surface that may be used as textured hydrophilic surface 220. This 3D pattern provides a continuous film of liquid attached to the scaffold that can be tensioned in order to increase absorption. The liquid is flowing so it is replenished. The pores themselves hold still air, but at these dimensions provide carbon dioxide diffusion to internal surfaces resulting in an increase of 5-20× of absorbing surface.

Figure 5:
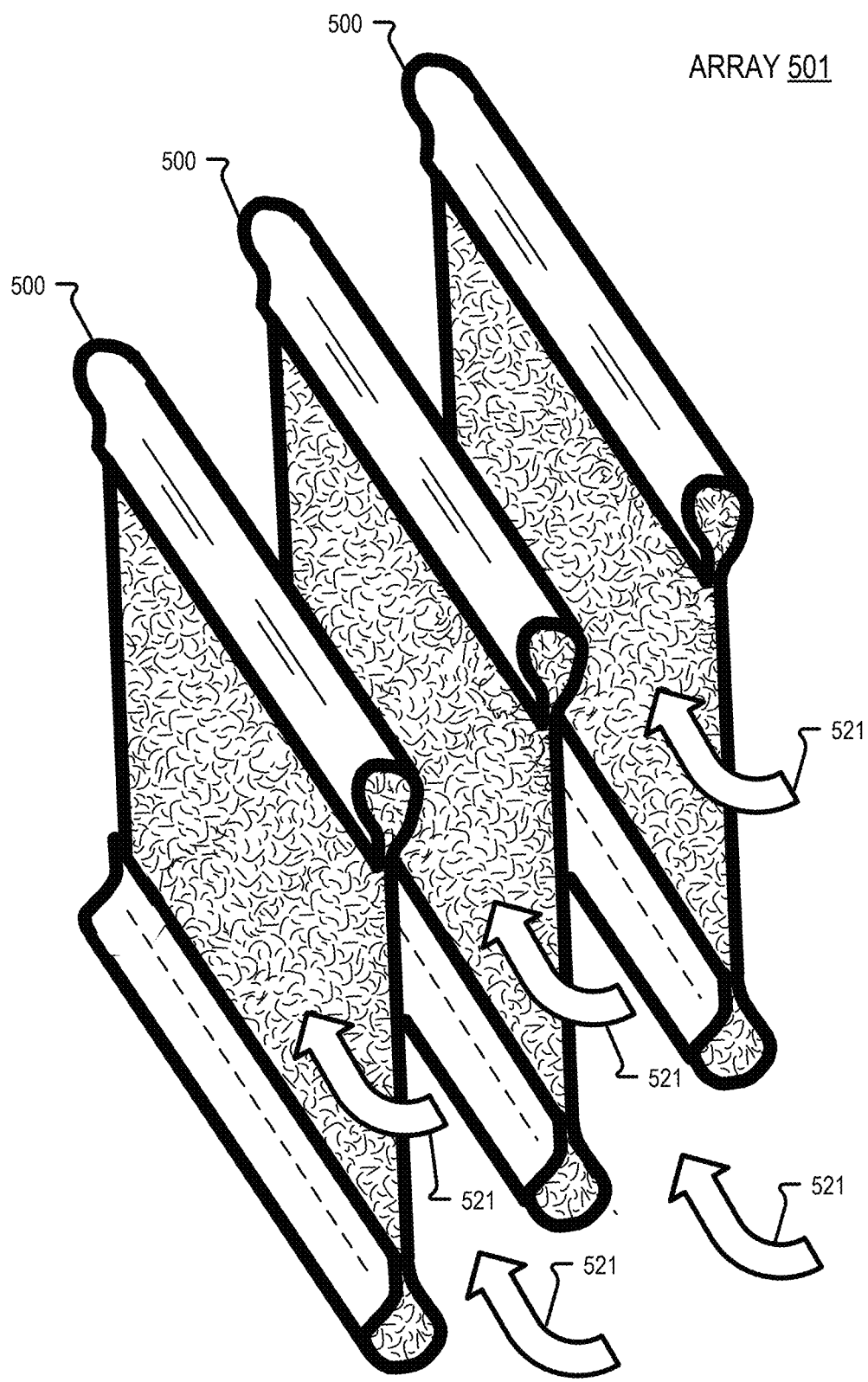
FIG. 5 illustrates an array of carbon capture devices that are disposed together, in accordance with aspects of the disclosure.

FIG. 5 illustrates an array 501 of devices 500 that are disposed together, in accordance with aspects of the disclosure. FIG. 5 shows that system 100 may be scaled to include multiple carbon capture devices with fans providing airflow 521 blowing between carbon capture devices 500. Devices 200 or 300 may be used as devices 500, in FIG. 5. In implementations, there can be grooves of 5-50 microns deep, rough features 1-100 microns, and ridges at 0.5-5 microns spacing. All of these are to ensure enough close curved surfaces attached to the hydrophilic substrate and tension generated interface film touching air.

Figure 6:
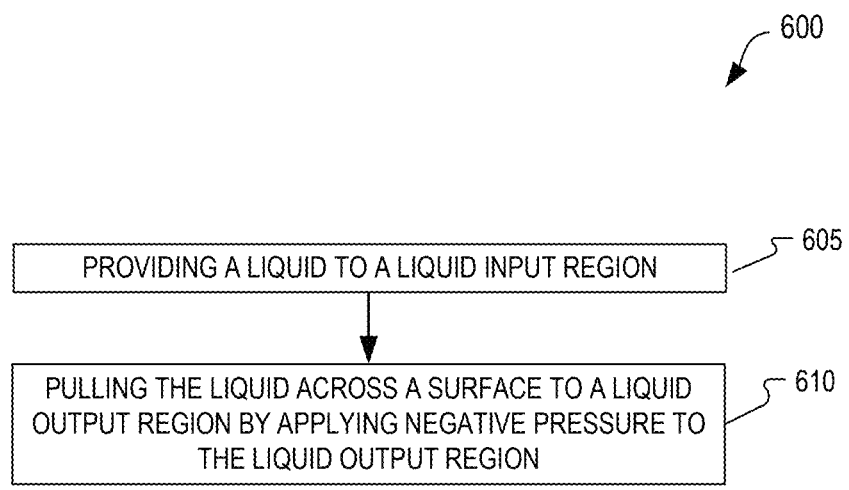
FIG. 6 illustrates a process of absorbing carbon dioxide from air, in accordance with aspects of the disclosure.

FIG. 6 illustrates a process 600 of absorbing carbon dioxide from air, in accordance with aspects of the disclosure. The order in which some or all of the process blocks appear in process 600 should not be deemed limiting. Rather, one of ordinary skill in the art having the benefit of the present disclosure will understand that some of the process blocks may be executed in a variety of orders not illustrated, or even in parallel.

In process block 605, a liquid (e.g. water or glycol) is provided to a liquid input region (e.g. liquid input region 103).

In process block 610, the liquid is pulled across a surface to a liquid output region by applying negative pressure to the liquid output region. The surface is disposed between the liquid input region and the liquid output region. The tension on the liquid running across the surface increases an absorption of the carbon dioxide in the air into the liquid. The rate of pulling liquid from the volume trapped between the air-liquid interface and hydrophilic films creates tension. And, when the restriction area is reduced, the pressure increases to maintain flow rate. The negative pressure may be facilitated by a liquid pump, for example.

The tension of the liquid running across the surface may be between 60 pounds-per-square-inch (PSI) and 500 PSI.

The surface described in process block 610 may not necessarily be the disclosed textured hydrophilic surface. In some implementations, the surface described in process block 610 includes a textured hydrophilic surface having microstructures of the textured hydrophilic surface sized between 1 and 100 microns.

Process 600 may further comprise driving one or more fans (e.g. fans 120) to drive the air over the liquid being pulled across the surface. In some implementations, the fans may be used such that the surface air flow generates turbulence that increases gas absorption into the liquid.

The disclosed examples may include tension absorption techniques that are 10 times (or more) efficient when compared to mechanical compression techniques. Advantageously, absorbed gas maintains most of its internal energy by being trapped as an intact gas molecule restrained by the liquid environment. In contrast, mechanical compression is obligated to raise the gas temperature in order to raise the pressure in order to increase gas absorption.

The term "processing logic" (e.g. processing logic 157) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), $I^2C$ (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A carbon dioxide absorption system comprising:
a liquid input region;
a liquid output region;
a textured hydrophilic surface disposed between the liquid input region and the liquid output region; and
a liquid pump coupled to the liquid output region, wherein the liquid pump is configured to pull liquid from the liquid input region to the liquid output region to place the liquid traversing the textured hydrophilic surface under tension without the liquid pump being hydraulically coupled to the liquid input region, wherein the liquid traversing the textured hydrophilic surface under tension increases absorption of carbon dioxide of air into the liquid.

2. The carbon dioxide absorption system of claim 1, wherein the tension of the liquid is between 60 pounds-per-square-inch (PSI) and 500 PSI.

3. The carbon dioxide absorption system of claim 1, wherein a liquid-air interface membrane is formed by the liquid traversing the textured hydrophilic surface, and wherein the liquid flowing in between microstructures of the textured hydrophilic surface, beneath the liquid-air interface membrane, increases the carbon dioxide absorption from the air into the liquid.

4. The carbon dioxide absorption system of claim 3, wherein the microstructures of the textured hydrophilic surface are sized between 1 and 100 microns.

5. The carbon dioxide absorption system of claim 1, wherein the textured hydrophilic surface includes sand adhered to a substrate, and wherein a hydrophilic layer covers a roughened texture provided by the sand.

6. The carbon dioxide absorption system of claim 5, wherein a size of the sand corresponds to between 500-grit sandpaper and 4000-grit sandpaper.

7. The carbon dioxide absorption system of claim 1, wherein microstructures of the textured hydrophilic surface are formed by anodizing metal.

8. The carbon dioxide absorption system of claim 7, wherein the anodized metal includes aluminum.

9. The carbon dioxide absorption system of claim 1, wherein the textured hydrophilic surface includes mesh having holes sized between 1 and 100 microns.

10. The carbon dioxide absorption system of claim 1, wherein the liquid is water, er-glycol, or a polar liquid.

11. The carbon dioxide absorption system of claim 1 further comprising:
one or more fans configured to drive the air over the liquid traversing the textured hydrophilic surface.

12. The carbon dioxide absorption system of claim 1 further comprising:
a pressure regulator valve coupled to the liquid input region and configured to limit the tension of the liquid traversing the textured hydrophilic surface to a threshold-limit, wherein the threshold-limit is between 10 PSI and 500 PSI.

13. The carbon dioxide absorption system of claim 1 further comprising:
a texture-to-texture interface disposed between the liquid input region and the textured hydrophilic surface, wherein the liquid is through the texture-to-texture surface, and wherein the texture-to-texture interface includes capillaries sized between 1 and 100 microns to allow the liquid to flow through while removing bubbles from the liquid prior to the liquid traversing the textured hydrophilic surface.

14. The carbon dioxide absorption system of claim 1, wherein liquid output region includes a texture-to-texture interface that the liquid is pulled through.

15. The carbon dioxide absorption system of claim 1, wherein the textured hydrophilic surface includes channels in the textured hydrophilic surface including openings flowing into restriction necks, wherein a width of the restriction neck is configured to: (1) restrict bubbles from traversing the restriction neck; and (2) prophylactically reabsorb the bubbles into the liquid flowing toward the liquid output region, and wherein the channels are defined by hydrophobic barriers.

16. The carbon dioxide absorption system of claim 1, wherein spaces between microstructures of the textured hydrophilic surface are sized to allow the liquid to be pulled through the spaces between the microstructures under the tension without cavitation.

17. A carbon dioxide absorption system comprising:
a liquid input region;
a liquid output region;
a textured hydrophilic surface disposed between the liquid input region and the liquid output region; and
a liquid pump coupled to the liquid output region to pull a liquid from the liquid input region and through the textured hydrophilic surface to the liquid output region, wherein the liquid pump is configured to apply negative pressure to place the liquid traversing the textured hydrophilic surface under tension to increase absorption of carbon dioxide of air into the liquid traversing the textured hydrophilic surface.

18. The carbon dioxide absorption system of claim 17, wherein spaces between microstructures of the textured hydrophilic surface are sized to allow the liquid to be pulled through spaces between the microstructures under the tension without cavitation.

19. The carbon dioxide absorption system of claim 17 further comprising: a pressure regulator valve coupled to the liquid input region and configured to limit the tension of the liquid traversing the textured hydrophilic surface.

20. A carbon dioxide absorption system comprising:
a liquid input region;
a liquid output region;
a textured hydrophilic surface disposed between the liquid input region and the liquid output region;

a liquid pump coupled to the liquid output region, wherein the liquid pump is configured to pull liquid from the liquid input region to the liquid output region to place the liquid traversing the textured hydrophilic surface under tension, and wherein spaces between microstructures of the textured hydrophilic surface are sized to allow the liquid to traverse through the microstructures without cavitation when the tension of the liquid provided by the liquid pump is between 60 pounds-per-square-inch (PSI) and 250 PSI; and a pressure regulator valve coupled to the liquid input region and configured to limit the tension of the liquid traversing the textured hydrophilic surface to a threshold-limit between 60 PSI and 250 PSI.

* * * * *